(12) United States Patent
Geiges et al.

(10) Patent No.: US 9,273,764 B2
(45) Date of Patent: Mar. 1, 2016

(54) DRIVE OF A SEAT ADJUSTING DEVICE FOR MOTOR VEHICLES

(71) Applicant: IMS GEAR GMBH, Donaueschingen (DE)

(72) Inventors: Christian Geiges, Blumberg (DE); Wolfram Hofschulte, Bonndorf (DE); Michael Woehrle, Niedereschach (DE); Guenter Weissenseel, Virginia Beach, VA (US)

(73) Assignee: IMS GEAR GMBH, Donaueschingen (DE)

( * ) Notice: Subject to any disclaimer, the term of this patent is extended or adjusted under 35 U.S.C. 154(b) by 163 days.

(21) Appl. No.: 13/827,784

(22) Filed: Mar. 14, 2013

(65) Prior Publication Data

US 2014/0123788 A1    May 8, 2014

(30) Foreign Application Priority Data

Nov. 7, 2012   (EP) .................................... 12191709

(51) Int. Cl.
*F16H 29/08*   (2006.01)
*F16H 25/08*   (2006.01)
*B60N 2/06*    (2006.01)

(52) U.S. Cl.
CPC ................ *F16H 25/08* (2013.01); *B60N 2/067* (2013.01); *Y10T 74/18568* (2015.01)

(58) Field of Classification Search
CPC .... Y10T 74/18568; F16H 25/08; B60N 2/067
See application file for complete search history.

(56) References Cited

U.S. PATENT DOCUMENTS

| | | | |
|---|---|---|---|
| 6,260,922 B1 * | 7/2001 | Frohnhaus et al. | 297/330 |
| 6,349,914 B1 * | 2/2002 | Yoshida et al. | 248/429 |
| 6,575,421 B1 * | 6/2003 | Houston et al. | 248/429 |
| 7,597,303 B2 * | 10/2009 | Kimura et al. | 248/429 |
| 7,950,616 B2 * | 5/2011 | Ehrhardt | 248/424 |
| 8,632,043 B2 * | 1/2014 | Dahlbacka et al. | 248/424 |
| 2004/0011939 A1 * | 1/2004 | Hohnl et al. | 248/424 |
| 2004/0089784 A1 * | 5/2004 | Garrido | 248/424 |

(Continued)

FOREIGN PATENT DOCUMENTS

| | | |
|---|---|---|
| DE | 100 03 305 C1 | 1/2000 |
| DE | 10 2010 063 044 A1 | 12/2010 |
| KR | 10-1049367 | 7/2011 |

OTHER PUBLICATIONS

Office Action dated Aug. 20, 2015 issued in corresponding Chinese application No. 201310251509.9.

(Continued)

*Primary Examiner* — David M Fenstermacher
(74) *Attorney, Agent, or Firm* — Juneau & Mitchell

(57) ABSTRACT

Drive of a seat adjusting device, especially for motor vehicles, with a spindle that is fastened on a first of two rails, which are adjustable with respect to each other by at least one mounting on one end of the spindle, and with a transmission driven by a motor that is mounted on the second rail, whereby the mounting is a single piece stamped bent part with a first area with at least one fastener opening and a second area that is offset upward relative to the first area for holding one end of the spindle, whereby the first area and the second area are connected to form a single piece by a transition area, whereby the second area is designed with a slot with legs lying opposite each other, at least in sections, and opposite a slot between which the end of the spindle can be fixed.

6 Claims, 5 Drawing Sheets

(56) References Cited

U.S. PATENT DOCUMENTS

2004/0155168 A1* 8/2004 Matsushiro .................. 248/424
2009/0000424 A1 1/2009 Taubmann et al.
2012/0305734 A1* 12/2012 Balin et al. .................... 248/430

OTHER PUBLICATIONS

Office Action dated Jul. 15, 2015 issued in corresponding Korean application No. 10-2013-0066714.

* cited by examiner

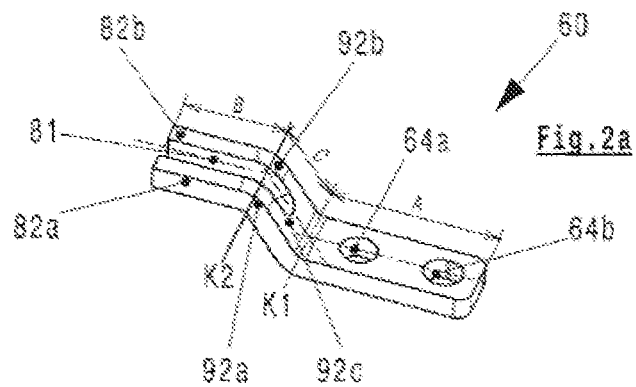
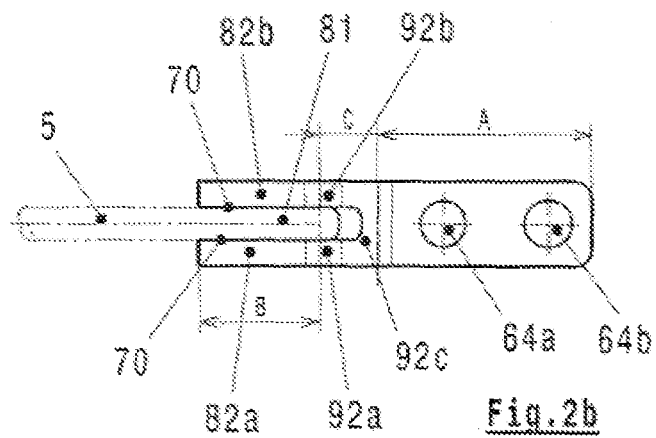
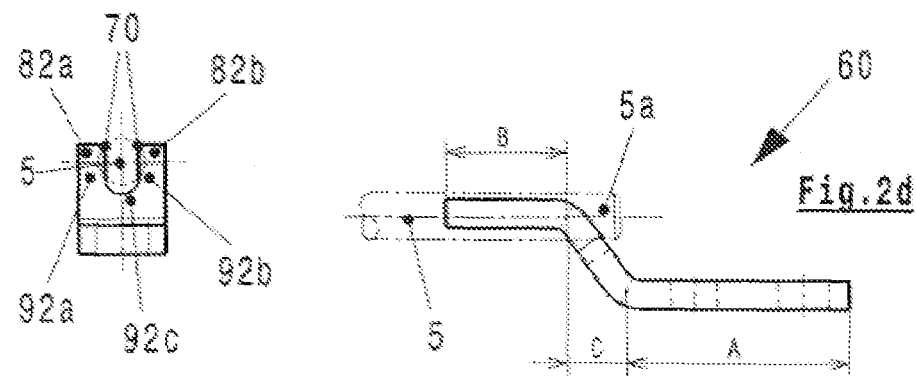

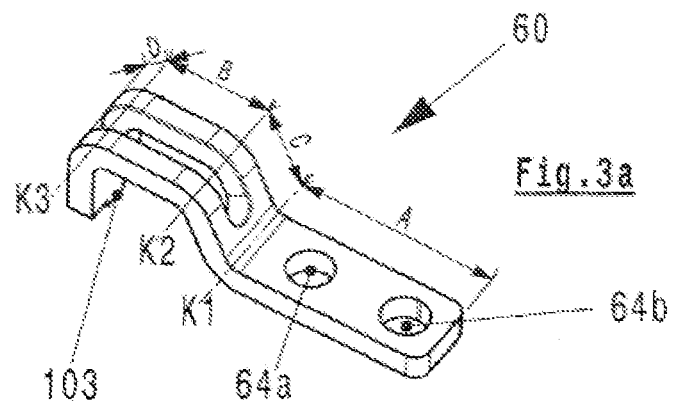
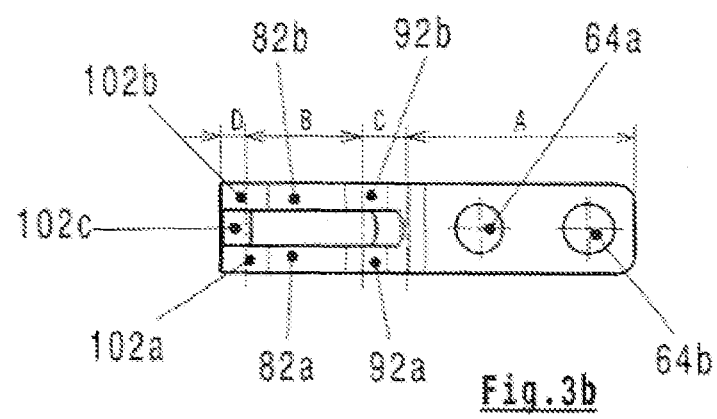
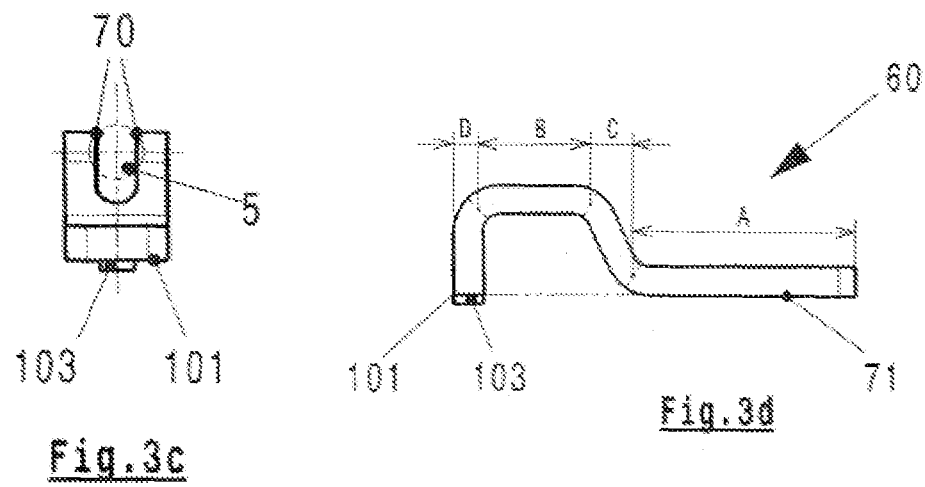

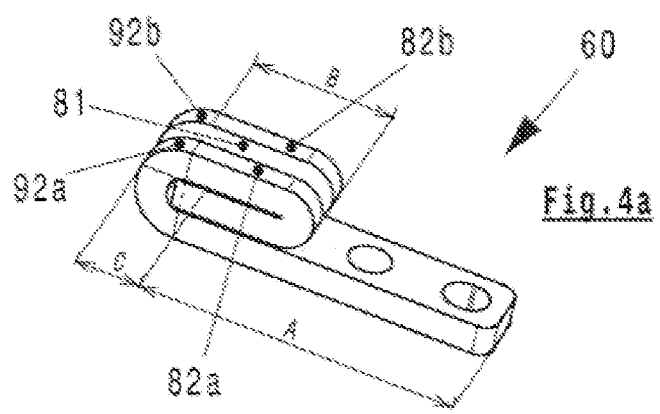
Fig.4a
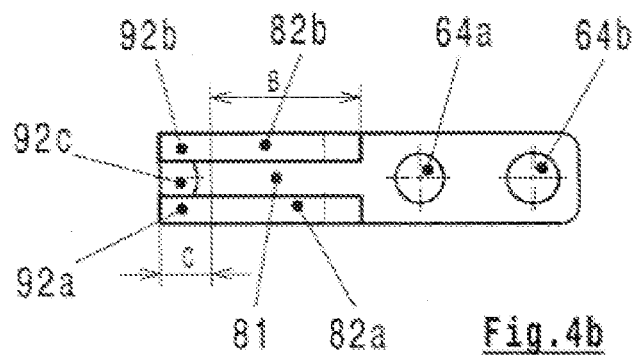
Fig.4b
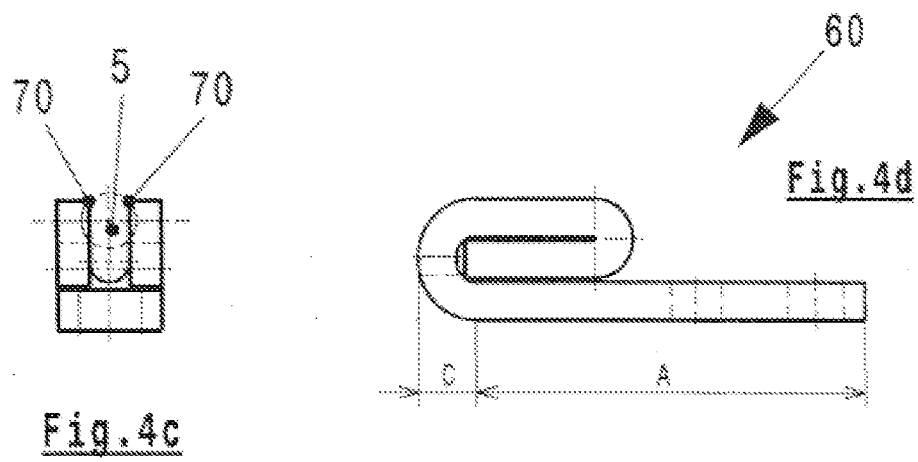
Fig.4c
Fig.4d

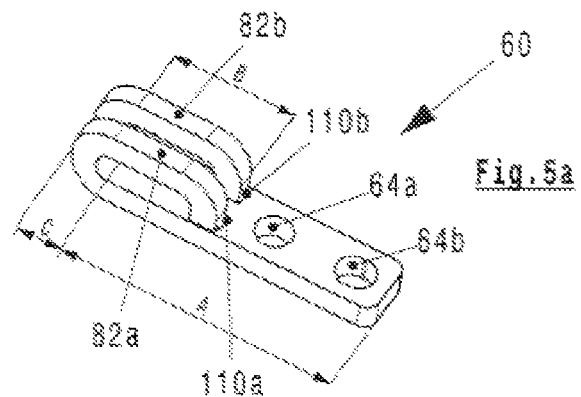
Fig.5a
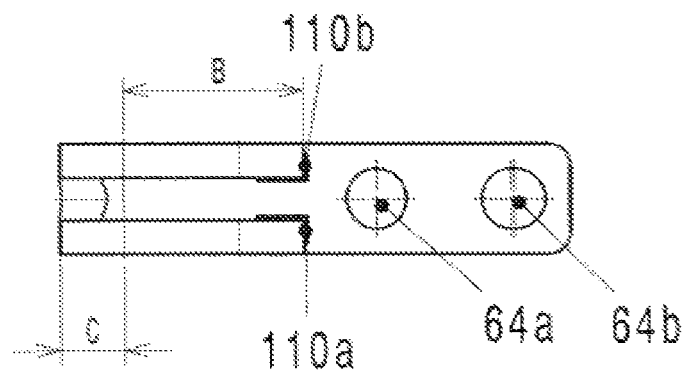
Fig.5b
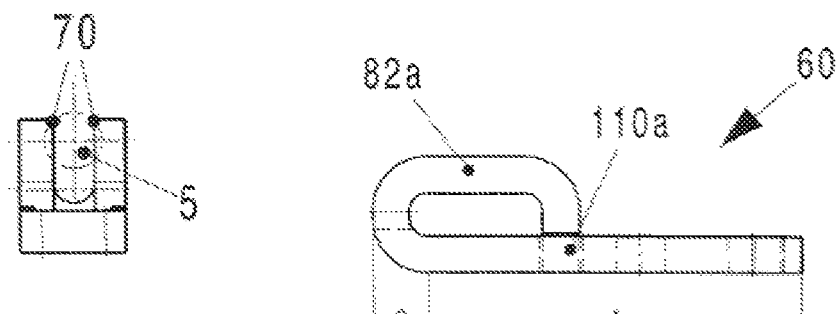
Fig5c
Fig.5d

DRIVE OF A SEAT ADJUSTING DEVICE FOR MOTOR VEHICLES

CROSS REFERENCE TO RELATED APPLICATIONS

This patent application claims priority to European Patent Application 12 191 709.0, filed on Nov. 7, 2012.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a planetary gear set with several gear stages.

The invention relates to a drive of a seat adjusting device for motor vehicles with a spindle that is fastened on a first of two rails, which can be adjusted relative to each other, by means of at least one mounting located on one end of the spindle and with a motor-driven transmission that is arranged on the second rail.

Such a drive is described in EP 1 068 093 B1. The drive is shown in the figure there and in the present FIG. 1. As can be seen, a retaining plate 1 on which the seat of the vehicle is to be fastened is assigned to an upper rail 3. On the retaining plate 1, mounting links 11 are provided for a motor 2 so that it can be tightly connected to the retaining plate 1 and thus tightly connected to the upper rail. On both sides of motor 2, drive shafts 21, 22 are arranged. Flexible shafts can be used for this. These drive shafts 21, 22 produce the connection to a transmission 9 that is described in detail in EP 1 068 093 B1.

The upper rail 3 glides directly, or over, adjusting and/or bearing elements that are not shown on a lower rail 4 that is fastened on a vehicle floor of the motor vehicle.

In the functional positions of upper rail 3 and lower rail 4, these are held by their contact and/or mounting areas so that a hollow space results. Inside this hollow space, a threaded spindle 5 is arranged. This threaded spindle 5 is held by mountings 6a and 6b, which are tightly mounted on the lower rail 4. For this purpose, the mountings 6a and 6b have fastener holes 6e through which suitable threaded connections or similar fasteners extend and are held on fastener holes 4a of the lower rail 4. The spindle 5 itself is bolted tightly on the mountings 6a and 6b using suitable fastening nuts 6c, 6d.

What is problematic in the drive shown in FIG. 1 is the design of the mountings 6a and 6b.

These mountings 6a, 6b designed with an L-shape are ordinarily manufactured as stamped bent parts. In this case, the mountings are first punched out of metal plates as strip-shaped elements and then bent in a right angle. In fact, such stamped bent parts are relatively easy to manufacture and are thus cost-effective. However, the strength of these mountings, which is too low, is a disadvantage. In fact, such stamped bent parts can absorb only limited forces in the case of a crash. In tests, it has been found that such stamped bent parts can handle relatively low forces of up to about 20 kN in the case of a crash.

In addition, another mounting for the end of a spindle for a seat adjusting device is known from DE 100 03 305 C1. The mounting in the embodiment described in FIG. 5 consists of a single-part metal stamped bent part, whereby the stamped bent part is provided with a front area with fastening openings for fastening the mounting on the chassis of a motor vehicle. On the opposite end, the mounting has a second area for holding the end of a spindle of the adjusting device. The two areas are connected to each other by an intermediate part in the manner of a single piece. The holding part for the spindle is first bent in a U-shape. The end of the spindle is inserted into the U-shaped opening, and then the two ends of the legs that are open upward are bent inward over the spindle and closed. After the two legs of the U-shaped mount have been bent over, these can be pressed together with the end of the spindle using a pressing tool.

Even though such a mounting is already an improvement over the mounting discussed above, in which the spindle must be fastened to an angled stamped bent part using lock nuts, a relatively complicated peening process is still necessary in order to fasten the end of the spindle in the mounting. Moreover, various bending processes in different directions that are required must be produced, which makes the manufacturing of the mounting time-consuming. In addition, after the spindle is inserted into the U-shaped opening of the mounting, an additional bending process of the mounting is required and also a peening process, which is also very complicated.

BACKGROUND OF THE INVENTION

The current state of knowledge is as follows.

The goal of the invention is to further develop the known drive in such a way that in the case of a crash, higher forces can be absorbed by the mounting or mountings than were previously the case, whereby the mounting is especially easy to manufacture and the construction space required will be reduced.

The goal is achieved by a drive with the characteristics claimed herein.

BRIEF SUMMARY OF THE INVENTION

In a preferred embodiment, a drive of a seat adjusting device, especially for motor vehicles, comprising a spindle that is fastened on a first of two rails, which are adjustable with respect to each other, by means of a mounting located at the end of the spindle and a transmission driven by a motor that is mounted on the second rail, whereby the mounting is a single piece stamped bent part with a first area with at least one fastener opening and with a second area that is offset upward with respect to the first area for holding one end of the spindle, whereby the first area and the second area are connected to form a single piece by a transition area, further comprising wherein the second area is designed with a slot with legs that lie opposite each other, at least in sections, and opposite a slot between which the end of the spindle can be fixed.

In another preferred embodiment, the drive as disclosed, further comprising wherein the first area and the second area are arranged next to each other seen in the axial direction of the spindle and the transition area is located between the first area and the second area.

In another preferred embodiment, the drive as disclosed, further comprising wherein the transition area is also at least partially designed with a slot in which the two legs of the second area extend into the transition area as partial legs and are connected there by a transverse leg.

In another preferred embodiment, the drive as disclosed, further comprising wherein the end of the spindle is fixed at a distance from the transverse leg.

In another preferred embodiment, the drive as disclosed, further comprising wherein the slot formed by the two legs is open on its side turned away from the first area.

In another preferred embodiment, the drive as disclosed, further comprising wherein the entire mounting, seen in cross section view along the axis of the spindle, is bent in approximately a Z-shape.

In another preferred embodiment, the drive as disclosed, further comprising wherein on the second area, on the side turned away from the first area, another area connects, that this other area is designed as a U-shape and with its open end connects to the second area, whereby a base of a transverse clip of the other area is arranged at at least the same height as the base of the first area.

In another preferred embodiment, the drive as disclosed, further comprising wherein that the transverse clip of the other area has a projecting engaging plug.

In another preferred embodiment, the drive as disclosed, further comprising wherein the first area extends to below the second area and the second area is designed as a quarter- or half-loop over the first area.

BRIEF DESCRIPTION OF THE DRAWINGS

FIGS. 2a, 2b, 2c and 2d are line drawings evidencing various views of a first exemplary embodiment of a mounting for holding the end of a spindle of a seat adjusting device.

FIGS. 3a, 3b, 3c and 3d are line drawings evidencing various views of a second exemplary embodiment of a mounting for holding the end of a spindle of a seat adjusting device.

FIGS. 4a, 4b, 4c and 4d are line drawings evidencing various views of a third exemplary embodiment of a mounting for holding the end of a spindle of a seat adjusting device.

FIGS. 5a, 5b, 5c and 5d are line drawings evidencing various views of a fourth exemplary embodiment of a mounting for holding the end of a spindle of a seat adjusting device.

DETAILED DESCRIPTION OF THE INVENTION

Figure 1:
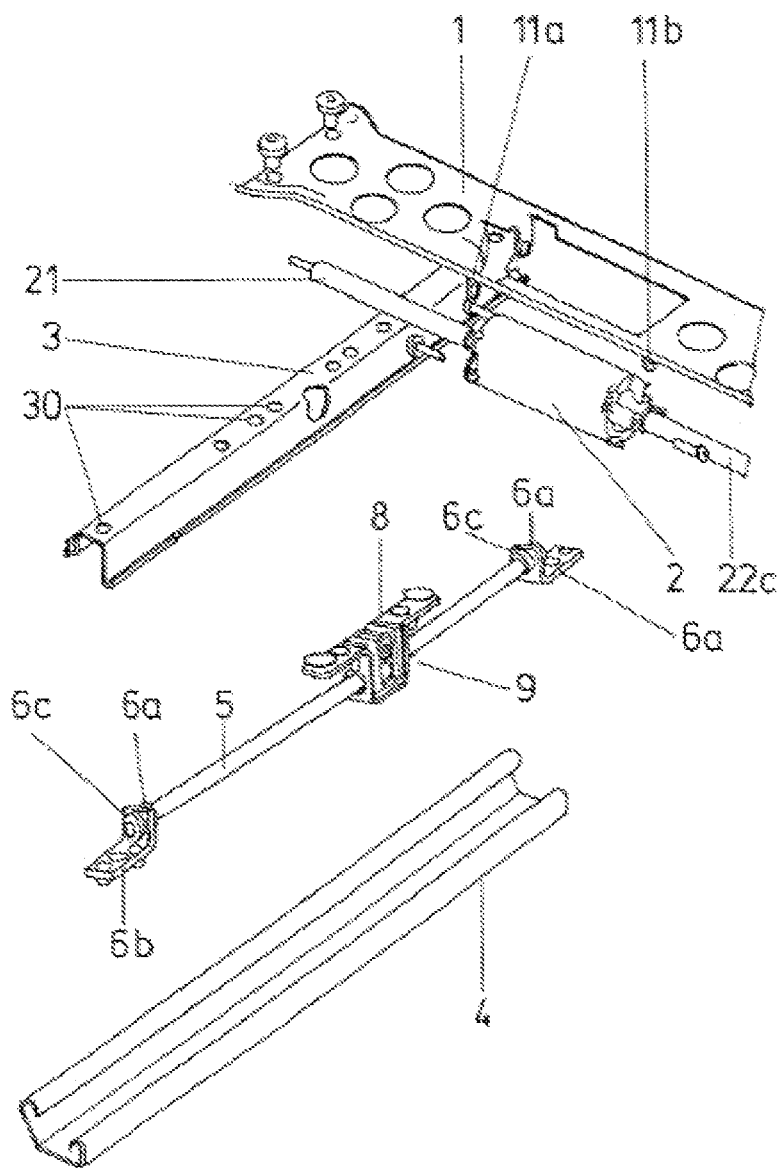
FIG. 1 is a line drawing evidencing the drive invention according to the known state of the art with a spindle fixed at its end by mountings on which a transmission that can move longitudinally rests.

The invention essentially consists in that the second area of the mounting that holds one end of the spindle is designed with a slot with at least two legs that lie opposite the slot, between which the end of the spindle is fixed.

The essential advantage of such a mounting in comparison to the mounting mentioned at the beginning consists in that the mounting requires only bending processes with bending edges that lie parallel to each other overall, namely orthogonally to the longitudinal axis of the spindle. A bending process in parallel to the spindle axis is no longer necessary.

Moreover, the mounting according to the invention is distinguished by high stiffness and little forward displacement so the object named at the beginning of providing a drive in which higher forces can be absorbed by the mounting or mountings in the case of a crash is fulfilled in the best way.

DETAILED DESCRIPTION OF THE FIGURES

Referring now to the figures, unless otherwise indicated, in the following figures the same reference numbers designate the same parts with the same meaning.

The mounting 60 that is shown in various views in FIGS. 2a to 2d is a stamped bent part that can be formed from metal, especially steel or sheet steel and is at least approximately Z-shaped seen in cross section. As can especially be seen from the perspective view in FIG. 2a and also in the top view of FIG. 2b, the mounting 60 has a first area A in which two fastener holes 64a, 64b are machined. These two fastener holes 64a, 64b lie next to each other and are provided so threaded fasteners can be passed through them in order to tightly bolt or tightly rivet the mounting 60 on a chassis floor of a motor vehicle.

As the cross section view of FIG. 2d especially clearly shows, connected to this first area A is a transition area C, which is bent along a bending edge K1 from the first part A diagonally upward in a single piece. This transition area C is shaped with an approximate U-shape with two legs 92a, 92b at a distance from each other and a connecting transverse leg 92c that connects the two legs 92a, 92b at the side turned toward the first area A. From this transition area C, parallel to the first area A a second area B extends. This second area B consists of the two legs 82a, 82b that are a direct extension of the legs 92a, 92b of the transition area C. Between these two legs 82a, 82b a slot 81 is found. Because of a bending process along a second bending edge K2, the two legs 82a, 82b of the second area B lie parallel to the first area A.

As can be seen from the representations of FIGS. 2a and 2b, a mounting 60 such as this requires only two bending processes along the bending edges K1 and K2, which lie parallel to each other.

FIGS. 2b, 2c and 2d indicate how the end 5a of a spindle 5 is inserted between the two legs 82a, 82b. In this case, the end 5a of the spindle can contact the transverse leg 92c in the transition area C. However, it is more advantageous for the spindle 5 not to contact there and to be arranged at a distance from the transverse leg 92c. A fastening of the end 5a of the spindle 5 is achieved in that the insides of the legs 82a, 82b are welded in a suitable way and/or connected with a form-fitting or frictional connection with the end 5a of the spindle 5.

The weld seam is provided with the reference number 70 in FIG. 2b and FIG. 2c.

The exemplary embodiment of FIGS. 3a to 3d largely corresponds to the exemplary embodiment already explained in FIGS. 2a to 2d. In contrast, on the second area B another area D is formed that is designed in approximately a U-shape and the two legs 82a, 82b of the second area are lengthened somewhat and lead vertically to the plane of a base 71 of mounting 60 and provide for a support of the mounting there. In this additional area D, as mentioned, the mounting 60 is designed with a U-shape and for this purpose has two legs 102a, 102b that connect to the free ends of legs 82a, 82b of the second area B and are connected to each other at their ends by a cross strap 102c. The underside of this cross strap 102c is provided with the reference number 101 and preferably runs plane parallel to the base 71 of area A of mounting 60. In the additional area D, preferably an engaging knob 103 extends downward from this base 101 in order to engage in a corresponding recess of the chassis of a motor vehicle so that an excellent positional fixing of the entire mounting 60 is ensured, which additionally makes force flow possible in the case of a crash.

As FIGS. 3a and 3b show, the mounting 60 has a third bending edge K3 between the second area B and the additional area D that has been named. This third bending edge K3 in turn lies parallel to the bending edges K1 and K2 that are already known.

A third exemplary embodiment of a mounting according to the invention for the end 5a of a spindle 5 is shown in FIGS. 4a to 4d. In contrast to the two exemplary embodiments previously named, now the first area A is designed so it is approximately twice as long, whereby the slotted area B over the intermediate area C is not bent away from the fastener holes 64a, 64b, rather back in the direction of these holes 64a, 64b.

While forming a single piece, the transition area C connects to the left end of the first area A and namely in such a way that the two legs 92a, 92b point in the direction of fastener openings 64a, 64b. At the end of these legs 92a, 92b, the legs 82a, 82b are connected and form a single piece, whereby these legs 82a, 82b are bent once by 180° so that overall a loop-shaped structure of area B results. Between the legs 92a, 92b of the intermediate part C and the legs 82a, 82b of the second part B, the end of spindle 5 can be inserted. With suitable welded connections, the spindle 5 can in turn be fixed in the slot 81.

Even if the exemplary embodiment in FIGS. 4a to 4d indicates that the legs 82a, 82b are bent back by 180°, this is not absolutely necessary. As indicated in the cross section view of FIG. 4d by the dotted lines, it is also possible to angle the ends of slots 82a, 82b only 90° downward so that the ends rest on the upper side of first area A of mounting 60.

Also this ensures adequate stability of the mounting.

It is also within the scope of the invention that the legs 82a, 82b that are bent backward rest directly on the upper side of section A and are not bent around their free end.

In the fourth exemplary embodiment according to FIGS. 5a to 5d, a similar mounting 60 to the one shown in the dotted line version in FIG. 4d is shown. However, the ends of the bent legs 82a, 82b now extend into associated openings 110a, 110b, which are placed in the first section A of mounting 60 on the left next to the first fastener opening 64a. By the extension of the ends of the two legs 82a, 82b into these openings 110a, 110b, a stabilization of legs 82a, 82b is achieved and, because of this, high stability of the spindle 5 that is installed between the two legs 82a, 82b is achieved in the case of a crash.

LIST OF REFERENCE NUMBERS

1 Retaining plate
2 Drive motor
3 Upper rail
4 Lower rail
4a Fastener hole
5 Spindle
5a Spindle end
6 Mounting
6a Mounting
6b Mounting
6c Fastening nut
6d Fastening nut
8 Mounting
8a Fastener hole
9 Transmission
11 Mounting link
21 Drive shaft
22 Drive shaft
60 Mounting
64a, 64b Fastener hole
70 Weld seam
71 Floor
81 Slot
82a, 82b Leg
92a, 92b Leg
92c Transverse leg
101 Underside
102a, 102b Leg
102c Transverse clip
103 Engaging plug, engaging knob
110a, 110b Openings
A First area
B Second area
C Transition area
D Additional area
K1 Bending edge
K2 Bending edge
K3 Bending edge The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. A drive of a seat adjusting device, especially for motor vehicles, comprising a spindle that is fastened on a first of two rails, which are adjustable with respect to each other, by means of a mounting located at the end of the spindle and a transmission driven by a motor that is mounted on the second rail, whereby the mounting is a single piece stamped bent part with a first area with at least one fastener opening and with a second area that is offset upward with respect to the first area for holding one end of the spindle, whereby the first area and the second area are connected to form a single piece by a transition area, further comprising wherein the second area is designed with a slot with legs that lie opposite each other, at least in sections, and opposite a slot between which the end of the spindle can be fixed.

2. The drive of claim 1, further comprising wherein the first area and the second area are arranged next to each other seen in the axial direction of the spindle and the transition area is located between the first area and the second area.

3. The drive of claim 1, further comprising wherein the transition area is also at least partially designed with a slot in which the two legs of the second area extend into the transition area as partial legs and are connected there by a transverse leg.

4. The drive of claim 1, further comprising wherein the end of the spindle is fixed at a distance from the transverse leg.

5. The drive of claim 1, further comprising wherein the slot formed by the two legs is open on its side turned away from the first area.

6. The drive of claim 1, further comprising wherein the entire mounting, seen in cross section view along the axis of the spindle, is bent in approximately a Z-shape.

* * * * *